March 19, 1968   W. C. ANDERSON   3,374,359
PHASE SHIFT DEVICE
Filed Oct. 25, 1963   2 Sheets-Sheet 2

INVENTOR.
WILMER C. ANDERSON
BY
ATTY.

United States Patent Office 3,374,359
Patented Mar. 19, 1968

3,374,359
PHASE SHIFT DEVICE
Wilmer C. Anderson, Greenwich, Conn., assignor to General Time Corporation, New York, N.Y., a corporation of Delaware
Filed Oct. 25, 1963, Ser. No. 319,036
12 Claims. (Cl. 307—106)

The present invention relates to a phase shift device and more specifically to a device for producing output pulses having a precise, but adjustable, time interval relationship therebetween.

A primary object of the present invention is to provide a new and improved phase shift device. Consequently, an object is to provide a phase shift device for producing output pulses having a precise time interval relationship therebetween. A related object is to provide such a phase shift device wherein the interval between output pulses is adjustable.

Another object of the present invention is to provide a phase shift device which is flexible in its application and operation and which is capable of operating substantially independently of the shape, duration or spacing of pulses applied thereto. An allied object is to provide such a device which is capable of operating over a wide speed range.

A further object of the present invention is to provide a phase shift device which is simple and compact so that it may be readily miniaturized. Thus, the device is well suited for utilization in apparatus wherein space is at a premium, such as missile, satellite, and space probe devices.

A more specific object of the present invention is to provide a phase shift device which makes novel use of magnetic counters of the type employing saturable reactors advanced from negative to positive saturation in accordance with the cumulative energy content of pulses applied thereto.

A general object of the invention is to provide a simple, compact, long life and economical phase shift device.

Other objects and advantages of this invention will become apparent upon reading the following detailed description and upon reference to the drawings, in which:

FIG. 3 is a block diagram of a first embodiment of means for preventing the simultaneous transmission of input pulses to the phase shift device in FIG. 1;

FIG. 4 is a block diagram of a second embodiment of means for preventing the simultaneous transmission of input pulses to the phase shift device in FIG. 1.

While the invention has been described in connection with certain preferred embodiments, it is to be understood that the invention is not to be limited to the disclosed embodiments but, on the contrary, the invention is intended to cover the various modifications and equivalent arrangements included within the spirit and scope of the appended claims.

Figure 1:
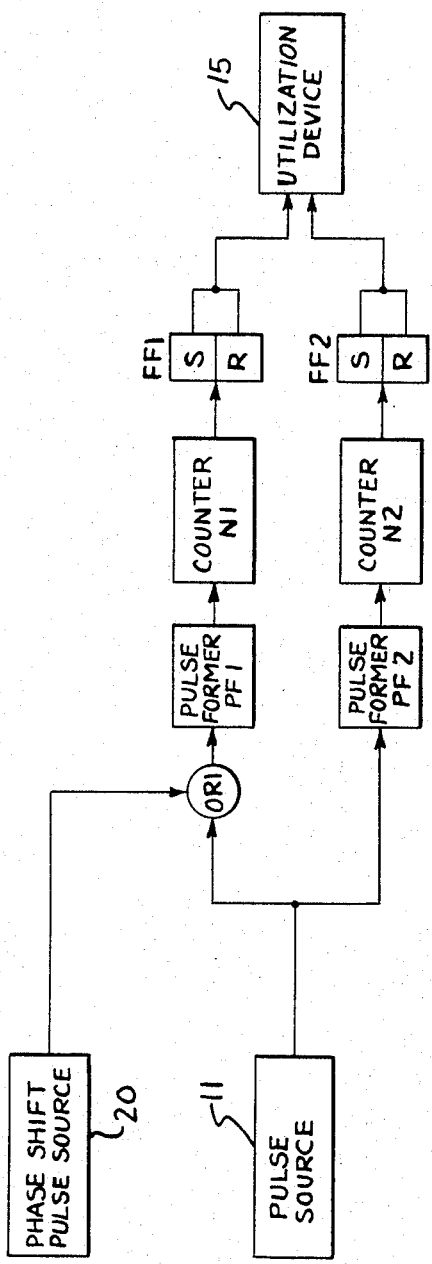
FIGURE 1 is a block diagram of a phase shift device constructed in accordance with the present invention.

Referring now to the drawings and more specifically to FIG. 1, a phase shift device is illustrated which is constructed in accordance with the present invention. The device preferably includes only solid-state elements and provides a pair of output pulses, having a precise, desired interval time relationship therebetween, which may be transmitted to a utilization device. More specifically, a device is provided for producing a pair of output pulses characterized in that the interval time relationship between the pulses may be varied so that a desired, precise interval time relationship exists therebetween.

A pair of counters N1 and N2 are provided in the phase shift device for counting the number of input pulses applied thereto and for producing an output pulse when filled. Preferably, the counters N1 and N2 are adjustable so that the number of pulses required to fill the counters may be varied and the counters may take any desired form, for example, the counters may be magnetic counters as discussed hereinafter. Input pulses are applied to the counters by a pulse source 11. As may be seen, the pulse source 11 is connected to the counter N1 through an OR gate OR1 and a pulse former PF1, whereas the pulse source is connected to the counter N2 through a pulse former PF2 only. The pulse formers PF1 and PF2 are provided to insure that the input pulses applied to the counters N1 and N2 have constant volt-second contents regardless of the shape, duration or spacing of the input pulses provided by the pulse source. However, it is to be understood that in the event the pulses provided by the pulse source 11 have constant volt-second contents or in the event the counters are capable of responding to pulses having any volt-second content, the pulse formers may be omitted.

In the illustrated embodiment, the outputs of the counters N1 and N2 are respectively connected to bistable devices FF1 and FF2 so that the output pulses produced thereby are transmitted to the bistable devices. In response to successive pulses being applied thereto, the bistable devices successively produce corresponding output pulses which alternate in polarity and which have constant volt-second contents. The output pulses produced by the bistable devices are in turn transmitted to a utilization device 15 which may be designed to control a desired operation or function in accordance with the interval time relationship between pulses produced by the bistable devices.

It is to be understood that the bistable devices FF1 and FF2 may take any desired form wherein output pulses alternate in polarity and wherein output pulses having constant volt-second contents are provided in response to succeeding input pulses applied thereto. However, in the present instance, the bistable devices are symbolically illustrated as flip-flops. The flip-flops are shown as rectangles having two sections, one being marked S and the other being marked R. Inputs to the flip-flops are connected to the junction of the S and R sections at the left-hand sides thereof and outputs are connected to the right-hand sides thereof. In response to the application of input pulses to the input, a flip-flop is switched between its two conditions, i.e., the set condition and the reset condition. When the flip-flop is driven to the set condition, a desired output is provided at the S output terminal only which is sustained until the flip-flop is reset and, conversely, when the flip-flop is driven to the reset condition, a desired output is provided at the R output terminal only which is sustained until the flip-flop is set. It follows that the time periods for the flip-flop output pulses are determined by the time period that the flip-flop is maintained in each stable condition.

As pulses are applied to the counters N1 and N2 in response to the production of pulses by the pulse source 11, the counters N1 and N2 are filled so that output pulses are produced thereby and are transmitted to the bistable devices FF1 and FF2. It will be apparent that, if the counters N1 and N2 are preset to be filled in response to the same number of pulses being applied thereto, output pulses will be simultaneously or concurrently produced by the counters so that output pulses are simultaneously provided by the bistable devices. Accordingly, the utilization device 15 will control the desired operation in accordance with zero itme interval existing between the pulses applied thereto.

In keeping with the present invention, the counters N1 and N2 are designed so as to be reset upon output pulses being produced thereby. Accordingly, if pulses are continuously produced by the pulse source 11, the counters will be cyclically filled to produce output pulses so that the bistable devices FF1 and FF2 are cyclically switched between the stable states thereof.

In further keeping with the present invention, means are provided for altering the time relationship between the production of output pulses by the counters N1 and N2. Since the bistable devices FF1 and FF2 are controlled by the counter output pulses, it follows that the time relationship between the production of output signals by the bistable devices FF1 and FF2 will be correspondingly altered. For this purpose, a phase shift pulse source 20 is provided for causing auxiliary input pulses to be applied to the counter N1 which supplement the pulses applied thereto in response to the production of output pulses by the pulse source. As may be seen, the output of the phase shift pulse source 20 is likewise connected to the input of the counter N1 through the gate OR1 and the pulse former PF1. When auxiliary input pulses are applied to the counter N1, it follows that less pulses from the pulse source 11 will be required to fill the counter N1 than are required to fill the counter N2. Accordingly, an output pulse will be produced by the counter N1 prior to the production of an output pulse by the counter N2, i.e., a time interval will exist therebetween. A corresponding time interval will also exist between the production of output signals by the bistable devices FF1 and FF2 so that the utilization device 15 will control the desired operation in accordance with the time interval existing therebetween.

Figure 2:
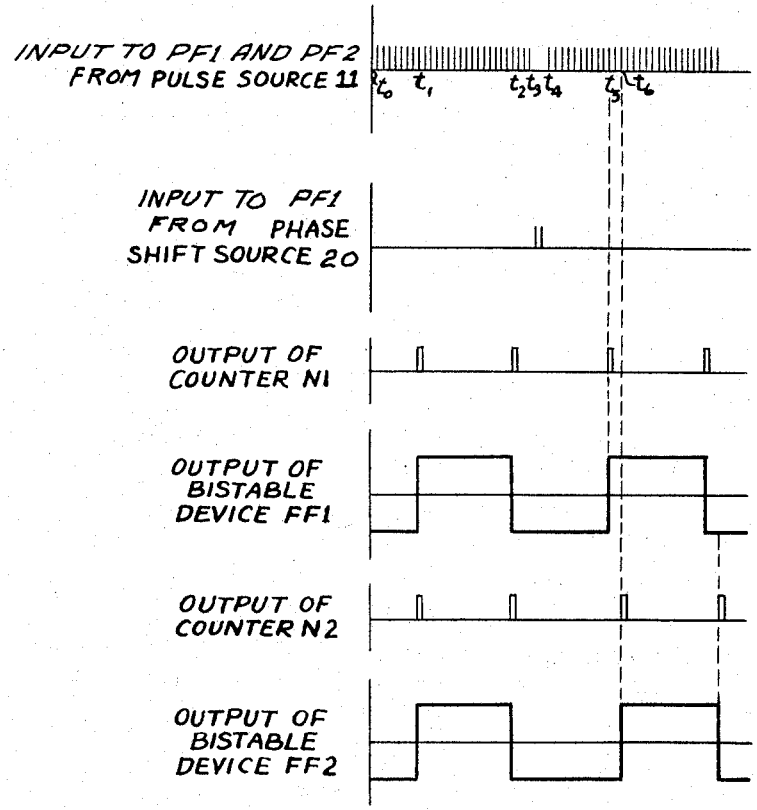
FIG. 2 illustrates the relationship between output pulses provided by the phase shift device in FIG. 1.

For a better understanding of the operation of the phase shift device, reference is made to FIG. 2. Let it be assumed (1) that at an initially selected time $t_0$ a count exists in the counters N1 and N2, (2) that negative output signals are being produced by the bistable devices FF1 and FF2, and (3) that the source 11 is operative to produce output pulses. It is further assumed that, at time $t_1$, both the counters N1 and N2 are filled so that output pulses are concurrently produced thereby. In response to the counter output pulses, the bistable devices FF1 and FF2 are simultaneously driven to the opposite stable states so that positive output signals are produced thereby. Accordingly, the utilization device 15 detects zero time interval between the transitions of the bistable devices from one stable state to the opposite stable state, i.e., between the production thereby of output signals having the same polarity, and controls a desired operation in accordance therewith.

Subsequently, at time $t_2$, the counters N1 and N2 are again filled to produce concurrent output pulses. It follows that the bistable devices FF1 and FF2 are then simultaneously driven back to the opposite stable state so that negative output signals are produced thereby. Accordingly, the utilization device again controls the desired operation in accordance with zero time interval existing between the transitions of the bistable devices and the production of output signals having the same polarity thereby.

Now, let it be assumed that between time $t_3$ and time $t_4$ the transmission of output pulses from the pulse source 11 to the counters N1 and N2 is momentarily interrupted whereas output pulses are produced by the phase shift pulse source 20 which are transmitted to counter N1. Under such conditions, it will be apparent that, at time $t_4$, a greater count will exist in counter N1 than in counter N2. At time $t_4$, pulses are again applied to the counters N1 and N2 from the pulse source 11 so that the counter N1 will be filled to produce an output pulse at time $t_5$. However, since the pulses from source 20 were not applied to the counter N2, it will not be filled at time $t_5$ but rather will be filled at time $t_6$, time $t_5$ preceding time $t_6$. Accordingly, an output pulse is produced by counter N1 a time interval prior to the production of an output pulse by counter N2, i.e., the pulses are out of phase, as determined by the number of output pulses produced by the phase shift pulse source 20 during the time period between times $t_3$ and $t_4$. Thus, the bistable device FF1 is driven to its opposite bistable state a time interval before the bistable device FF2 is driven to its opposite stable state so that the utilization device 15 detects a time interval therebetween and controls a desired operation in accordance therewith. Thereafter, the output pulses produced by the counters remain out of phase this same time period in the absence of the production of pulses by the phase shift source 20. If pulses are subsequently provided by the phase shift source, it will be apparent that the time interval between output pulses produced by the counters N1 and N2 will be modified again.

In view of the foregoing, it will be apparent that output pulses may be produced with a desired time interval existing therebetween as determined by the integral multiples of a single pulse time and that the time interval may be readily altered, i.e., the pulses may be shifted in phase relative to one another. For example, assuming that N pulses are required to fill the counters and pulses are produced by the source 11 at a frequency $f$, it follows that output pulses will be produced by the counters at a rate $f/N$. If $n$ supplementary pulses are introduced into the counter N1 by the phase shift pulse source 20, it will be apparent that $n$ less pulses from the pulse source 11 will be required to fill the counter N1 than are required to fill the counter N2. Accordingly, an output pulse will be produced by the counter N1 a time period before the production of an output pulse by the counter N2 determined by the time required for $n$ pulses to be applied to the counter N2, this time period corresponding to a phase shift of $n/f$ seconds or $$2\pi\frac{n}{\omega}$$

radians. Thus, if the counters have a capacity of one million, for example, then a resolution of one part in a million is possible in relative phase shifts by introducing one auxiliary pulse from the phase shift pulse source 20 to the counter N1. Further, if it is assumed that the pulse source 11 has a frequency of ten megacycles and the counters have capacities of ten-million pulses, then phase shifts can be established between the output pulses of the counters N1 and N2 from zero to one second in increments of .1 microsecond.

In further keeping with the present invention, means are provided for insuring the alternative transmission of pulses N1 from the pulse source 11 or the phase shift pulse source 20. Referring to FIG. 3, a first exemplary embodiment of such means is illustrated wherein an inhibit gate IN1 is interposed between the pulse source 11 and the counters N1 and N2, the outputs of both the pulse source 11 and the phase shift pulse source 20 being connected to inputs of the gate IN1. As is well known to those skilled in the art, inhibit gates may be designed so that a desired output is provided thereby only when an input signal is applied to a selected input, e.g., an input pulse from the pulse source 11. When an input signal is received at the other input, e.g., an input pulse from the phase shift pulse source 20, or when input signals are simultaneously received at the two inputs, the desired output is not provided. Accordingly, in the present instance, output pulses will not be transmitted from the gate IN1 to the counters N1 and N2 when output pulses are simultaneously applied to the gate by the pulse source 11 and the phase shift pulse source 20 or when an output pulse is applied thereto only by pulse source 20. Conversely, when output pulses are produced by the pulse source 11 only, pulses will be transmitted from the gate IN1 to the counters N1 and N2. Thus, the gate IN1 prevents the simultaneous transmission of pulses from the two pulse sources to the counter N1. An exemplary inhibit gate utilized for this purpose is disclosed on page 218 of the Department of Army Technical Manual TM 11–690, entitled "Basic Theory and Application of Transistors."

Referring to FIG. 4, an alternate exemplary arrangement is provided for complementally enabling the transmission from the pulse sources 11 and 20. Referring thereto, it may be seen that the pulses from the phase shift pulse source 20 are transmitted through a gate AND1 and that the pulses from the pulse source 11 are transmitted through a gate AND2. As a result, pulses can only be transmitted from the pulse sources to the counters when the associated AND gates are open. In the present instance, a bistable device or flip-flop FF3 is provided for controlling the operation of the gates AND1 and AND2. The bistable device FF3 corresponds to the previously described bistable devices FF1 and FF2. As may be seen, the S output terminal is connected to the input terminal of gate AND1 and the R output terminal is connected to the input of gate AND2. It follows that, when the bistable device is in the set condition and output pulses are provided by the phase shift pulse source 20, pulses are transmitted from the gate AND1 to the counter N1. Likewise, when the bistable device is in the reset condition and output pulses are produced by the pulse source 11, pulses are transmitted from the gate AND2 to the counters N1 and N2. For the purpose of controlling the operation of the bistable device FF3, a control pulse source 25 is provided to produce an output pulse when rendered operative so that the bistable device may be switched between its stable states whereby the transmission of pulses from the pulse sources 11 and 20 to the counters N1 and N2 is regulated.

Though several arrangements have been illustrated for preventing the simultaneous transmission of pulses to the counter N1, it is to be understood that the invention is not intended to be limited to the disclosed arrangements, but rather is intended to include any arrangements for performing the desired function.

As previously mentioned, the counters N1 and N2 may take the form of magnetic counters. Magnetic counters suitable for such use are commercially available under the name "Incremag" and are described in detail in U.S. Patent No. 2,897,380, issued July 28, 1959, to C. Neitzert to which reference is made for the details of construction and operation.

Figure 5:
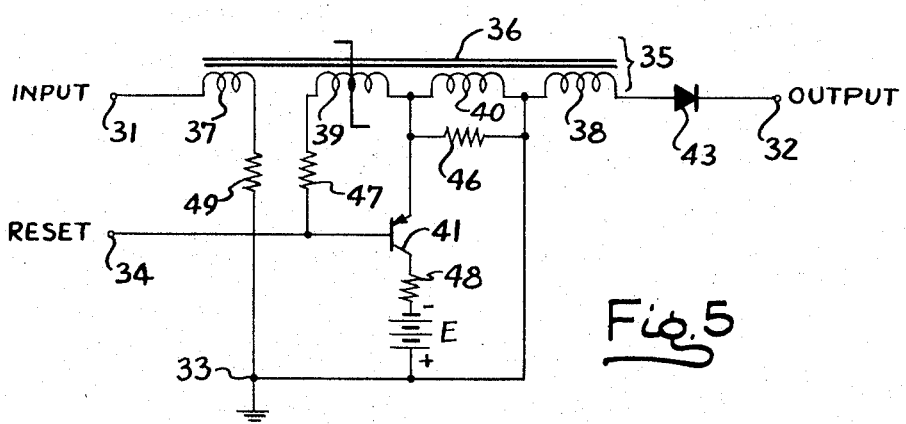
FIG. 5 is a schematic diagram of a magnetic counter which may be utilized in the phase shift device of FIG. 1.

Referring to FIG. 5, a counter constructed in accordance with the above-mentioned Neitzert patent is illustrated. Briefly stated, the counter has an input terminal 31, an output terminal 32, a ground terminal 33 and a reset terminal 34. Power is supplied to the counter by a power supply designated as E. The heart of the counter is a saturable reactor 35 having a core 36, an input winding 37, an output winding 38, a triggering winding 39 and a reset winding 40. A transistor 41 having a base, an emitter and a collector, designated as $b$, $e$ and $c$, has its input circuit connected across the triggering winding 39, has its output circuit connected in series with the reset winding 40. The material of the core 36 is so chosen that, when an input pulse is applied to the input terminal 37, the magnetization of the core is advanced one step from negative saturation toward the condition of positive saturation. When a predetermined number of input pulses have been applied to the input winding, as determined by the volt-second content thereof, the saturation of the core is exceeded, i.e., the core is set and, when the last pulse is removed, the sudden collapse of the excess flux induces a voltage in the triggering winding 39 which is in a direction to initiate conduction in the transistor 41. The resulting flow of current in the reset winding 40 induces a voltage in the triggering winding 39 which causes still further current flow through the transistor output circuit to a point where a condition of negative saturation is achieved in the core of the reactor, i.e., the core is reset. When the core is driven from positive saturation to negative saturation, an output pulse is induced in the output winding 38 which is transmitted through a diode 43 to the output terminal 32 and, when the core has been driven back to the condition of negative saturation, the counter is conditioned to receive a new series of input pulses. The core may also be reset by applying a negative pulse to a reset input terminal 34 associated with the base of the transistor 41.

To prevent operation of the transistor 41 in response to small changes in flux which occur during each step of advancement toward saturation, a damping resistor 46 is connected in parallel with the reset winding 40. Moreover, to limit the base current of the transistor in the face of a large voltage induced in the triggering winding, a series resistor 47 is used. Finally, there is provided in series with the collector of transistor 41 a low-value resistor 48 for the purpose of limiting the reset current, which not only tends to protect the transistor, but which also limits the load which is placed on the power supply E, and there is provided in series with the input winding 37 a resistor 49 for limiting the flow of input current.

It should be noted that any desired number of counters, such as the magnetic counter illustrated in FIG. 5, may be connected in tandem or cascaded so that a desired number of input pulses are required to be provided before an output pulse is produced by the tandem or cascaded arrangement, as disclosed in the above-mentioned Neitzert patent.

In view of the foregoing, it will be apparent that a phase shift device has been provided for producing a pair of output pulses having a desired interval time relationship therebetween wherein the interval time relationship may be readily varied. Additionally, it will be readily apparent that any desired time-interval-sensitive utilization device may be associated with the outputs of the phase shifter for controlling a desired operation. For example, it may be desirable to trigger a strobe light at two different times during each operating cycle of a piece of variable-speed machinery (such as for strobe picture taking), the two times having a definite phase lag between them which is independent of machine speed and which is variable. This may be accomplished by driving the pulse source 11 from the machine, e.g., by a commutator thereof, so that it produces a desired number of pulses per cycle regardless of the machine speed. Pulse source 20 may be manually turned on until the desired phase difference or lag is obtained. Finally, pulses from the source 11 may be manually interrupted to move both triggering points around to desired positions in the machine cycle. During this latter step and during any time when the machine speed varies, the selected phase lag always remains constant. Likewise, the outputs of the phase shifter may be utilized in applications, for example, wherein it is desirable to trigger devices at different times in a time-sharing cycle, such as triggering different parts of a multiplex oscilloscope display, or wherein it is desirable to vary the coincidence point between pulses applied to a delay line.

I claim as my invention:

1. In a phase shift device, the combination which comprises, first and second counters having the same capacity for independently counting pulses applied thereto and for producing output signals when filled, means for concurrently applying pulses to both counters whereby the counters are filled at a desired rate, means for applying auxiliary pulses to one but not the other of the counters, and means for interrupting said concurrently applied pulses in response to the application of said auxiliary pulses so that a desired differential count exists between the counters and output signals are produced thereby with a desired time interval therebetween.

2. In a phase shift device, the combination which comprises, first and second counters having the same capacity for independently counting pulses applied thereto and for producing output signals when filled, first means for concurrently applying streams of pulses to both counters whereby the counters are filled at a desired rate, second means for applying auxiliary pulses to only one of the counters, and means responsive to said last-named means for deleting a pulse from both of said concurrently applied streams of pulses for each of said auxiliary pulses so that a desired differential count exists between the counters and output signals are produced thereby with a desired time interval therebetween.

3. In a phase shift device, the combination which comprises, first and second counters having the same capacity for independently counting pulses applied thereto and for producing output signals when filled, means associated with each counter for resetting the counter upon an output pulse being produced thereby, first means for concurrently applying pulses to both counters whereby the counters are filled at a desired rate, second means for applying auxiliary pulses to only said first counter and means for complementally enabling application of pulses by said first and second means to said counters, cutting off pulses from said second counter while auxiliary pulses are being applied to said first counter so that a desired differential count exists between the counters and output signals are produced thereby with a desired time interval therebetween.

4. In a phase shift device, the combination which comprises, first and second counters having the same capacity for independently counting pulses applied thereto and for producing output signals when filled, first means for concurrently applying streams of pulses to both counters whereby the counters are filled at a desired rate, second means for applying auxiliary pulses to said first counter, and means responsive to the auxiliary pulses for deleting at least one pulse from said streams of pulses for each of said auxiliary pulses so that for each of the auxiliary pulses said second counter drops at least one count behind said first counter and output signals are produced thereby with a desired time interval therebetween.

5. In a phase shift device, the combination which comprises, first and second counters having the same capacity for independently counting pulses applied thereto and for producing output signals when filled, a first pulse source, means operative to transmit the pulses from the first source to both counters whereby the counters are filled at a desired rate, an auxiliary pulse source, and means for interrupting transmission of pulses from said first source to both said counters while applying pulses from said auxiliary pulse source to only one of said counters and output signals are produced thereby with a desired time interval therebetween.

6. In a phase shift device, the combination which comprises, first and second counters having the same capacity for independently counting pulses applied thereto and for producing output signals when filled, a high frequency pulse source, means operative to transmit the high frequency pulses to both counters whereby the counters are cyclically filled at a desired rate, a low frequency auxiliary pulse source, and means for interrupting transmission of said high frequency pulses to both said counters while applying auxiliary pulses to only one of said counters between the counters and output signals are produced thereby with a desired time interval therebetween.

7. In a phase shift device, the combination which comprises, first and second counters having the same capacity for independently counting the pulses applied thereto and for producing output signals when filled, a first pulse source, means operative to transmit pulses from the first source to both counters whereby the counters are filled at a desired rate, an auxiliary pulse source, means operative to transmit pulses from the auxiliary source to only one of the counters to the exclusion of pulses from said first source to either of the counters so that a desired differential count exists between the counters and output signals are produced thereby with a desired time interval therebetween, and a device independently associated with each counter for producing an output pulse having a desired volt-second content in response to the production of an output signal by the associated counter.

8. In a phase shift device, the combination which comprises, first and second counters having the same capacity for independently counting pulses applied thereto and for producing output pulses when filled, the counters being automatically reset when filled, first means for concurrently applying streams of pulses of a given frequency to both counters whereby the counters are cyclically filled at a desired rate, second means for applying auxiliary pulses at said given frequency to only one of the counters, and means for deleting a pulse from each of said streams of pulses for each of said auxiliary pulses so that a desired differential count exists between the counters and output pulses are produced thereby with a desired time interval therebetween.

9. In a phase shift device, the combination which comprises, first and second counters for independently counting pulses applied thereto and for producing output signals when filled, means for concurrently applying pulses to both counters whereby the counters are filled at a desired rate, and means for applying auxiliary pulses to only one of the counters in place of and to the exclusion of said concurrently applied pulses so that a desired differential count exists between the counters and output signals are produced thereby with a desired time interval therebetween.

10. The combination of claim 3 wherein said means for complementally enabling includes a bistable device having a pair of complemental outputs, a first gating means for receiving one of the outputs of said bistable device and the output of said first means, a second gating means for receiving the other output of said bistable device and the output of said second means and control means for successively reversing the state of said bistable means so as to alternatively enable said first or said second means but not both to apply pulses to said counters and said first counter respectively.

11. The combination of claim 4 wherein said means responsive to the auxiliary pulses includes gating means connected between said first means and said counters and having a control input connected to said second means for interrupting flow of said streams of pulses for the duration of the flow of auxiliary pulses.

12. The combination of claim 11 wherein said auxiliary pulses are of substantially the same duration as the pulses in said stream and wherein said gating means is operative to delete one pulse from each of said streams of pulses for each of said auxiliary pulses.

References Cited
UNITED STATES PATENTS

| | | | |
|---|---|---|---|
| 2,939,115 | 5/1960 | Bobeck | 340—174 |
| 3,097,340 | 7/1963 | Dobbie | 328—39 XR |
| 3,270,288 | 8/1966 | Hackett | 328—99 XR |
| 2,983,872 | 5/1961 | Williamson et al. | 318—20.370 |
| 3,011,110 | 11/1961 | Yu-chi Ho et al. | 318—20.370 |
| 3,078,400 | 2/1963 | Kilroy et al. | 318—20.370 |
| 3,079,522 | 2/1963 | McGarrell | 318—20.370 |
| 3,109,974 | 11/1963 | Hallmark | 318—163 |
| 3,175,138 | 3/1965 | Kilroy et al. | 318—20.105 |
| 3,258,667 | 6/1966 | McDonough et al. | 328—42 XR |

MILTON O. HIRSHFIELD, *Primary Examiner.*

J. J. SWARTZ, D. F. DUGGAN, *Assistant Examiners.*